United States Patent
Yoshizawa et al.

[11] Patent Number: 6,079,227
[45] Date of Patent: Jun. 27, 2000

[54] METHOD FOR MANUFACTURING BENT AND TEMPERED GLASS SHEET AND APPARATUS FOR MANUFACTURING THE SAME

[75] Inventors: Hideo Yoshizawa; Toru Futagami; Kazushi Shinozaki; Mamoru Takimura; Takeshi Yabuno, all of Osaka, Japan

[73] Assignee: Nippon Sheet Glass Co., Ltd., Osaka, Japan

[21] Appl. No.: 09/088,858

[22] Filed: Jun. 2, 1998

[30] Foreign Application Priority Data

Jun. 5, 1997 [JP] Japan .................................. 9-147438
Jun. 12, 1997 [JP] Japan .................................. 9-154866

[51] Int. Cl.$^7$ .......................... C03B 13/00; C03B 15/00; C03B 17/00; C03B 19/00; C03B 25/00
[52] U.S. Cl. .............................. 65/95; 65/25.2; 65/25.4; 65/64; 65/104; 65/115; 65/157; 65/182.2; 65/194; 65/273; 65/287; 65/349; 65/350; 65/351
[58] Field of Search ........................ 65/25.2, 25.4, 65/64, 84, 94, 95, 104, 107, 115, 157, 182.2, 194, 268, 273, 285, 287, 349, 350, 351

[56] References Cited

U.S. PATENT DOCUMENTS

| | | |
|---|---|---|
| 2,188,401 | 1/1940 | Crowley . |
| 3,223,443 | 12/1965 | Misson ...................................... 65/25.2 |
| 3,245,772 | 4/1966 | Cypher et al. . |
| 3,372,016 | 3/1968 | Rahrig et al. . |
| 3,396,000 | 8/1968 | Carson et al. ............................. 65/115 |
| 3,497,340 | 2/1970 | Dennison et al. . |
| 3,526,490 | 9/1970 | Misson . |
| 4,182,619 | 1/1980 | Greenhalgh ............................... 65/115 |
| 4,236,909 | 12/1980 | Thomas et al. ............................ 65/351 |
| 4,314,836 | 2/1982 | Seymour .................................... 65/115 |
| 4,400,194 | 8/1983 | Starr ......................................... 65/115 |
| 4,767,439 | 8/1988 | Reunamaki ............................... 65/351 |
| 4,853,019 | 8/1989 | Blank et al. .............................. 65/25.4 |
| 4,886,540 | 12/1989 | Nitschke . |
| 5,127,932 | 7/1992 | Aratani ..................................... 65/115 |

FOREIGN PATENT DOCUMENTS

| | | |
|---|---|---|
| 0 425 998 | 5/1991 | European Pat. Off. . |
| 14 21 784 | 10/1968 | Germany . |
| 14 71 880 | 3/1969 | Germany . |
| 14 71 944 | 3/1969 | Germany . |
| 44-14832 | 7/1969 | Japan . |
| 48-5242 | 2/1973 | Japan . |
| 4-41152 | 9/1992 | Japan . |
| 7-237928 | 9/1995 | Japan . |

OTHER PUBLICATIONS

International Search Report for EP 98 30 4466, Aug. 31, 1998.
International Search Report for EP 98 30 4486, Sep. 14, 1998.

*Primary Examiner*—Stanley S. Silverman
*Assistant Examiner*—Jacqueline A. Ruller
*Attorney, Agent, or Firm*—Merchant & Gould P.C.

[57] ABSTRACT

In a quenching apparatus for quenching a glass sheet that has been heated and bent in a heating furnace, a cooling gas blows onto the glass sheet to provide a distribution of a temperature and/or a distribution of a static pressure in at least one section in the quenching apparatus. The distribution of a temperature provides different temperatures between the both surfaces of the glass sheet, while the distribution of a static pressure is nonuniform in a part of at least one surface of the glass sheet. The distributions can modify a shape of the glass sheet given in the heating furnace so that a degree of freedom in shape for manufacturing a bent and tempered glass sheet by utilizing its self-weight can be improved.

10 Claims, 12 Drawing Sheets

PRIOR ART

FIG.12

METHOD FOR MANUFACTURING BENT AND TEMPERED GLASS SHEET AND APPARATUS FOR MANUFACTURING THE SAME

FIELD OF THE INVENTION

The present invention relates to a method for manufacturing a bent and tempered glass sheet and an apparatus for manufacturing the same, and, more particularly, to a method and an apparatus for manufacturing a bent and tempered glass sheet useful for architecture, automobiles or the like.

BACKGROUND OF THE INVENTION

A tempered glass sheet, one kind of safety glass sheets, has been used extensively as a window glass sheet for buildings, automobiles or the like. As a method for manufacturing such a tempered glass sheet, an air-cooling method has been widely used, which comprises quenching a glass sheet that has been heated to a temperature around its softening point by blowing a cooling air to form a residual compression stress layer at the surface of the glass sheet.

On the other hand, the demand for a glass sheet with a predetermined curved shape has become higher, especially in the field of automobile windows to meet the requirement for automobile design and an aerodynamic property. Therefore, in the air-cooling method, the heated glass sheets are often bent before blowing a cooling air. Some methods are known as a method for bending a glass sheet while tempering. For example, in one method, a glass sheet is heated and pressed by a pair of convex and concave press dies while the glass sheet is suspended by tongs (hoisting accessories). In another method, a glass sheet that has been heated while horizontally carried in a heating furnace is pressed by a pair of upper and lower press dies.

In such bending methods utilizing a pair of press dies, the step of softening a glass sheet by heating and the step of bending the glass sheet are basically separated. However, a method for conducting these steps as the same step has been proposed. In this method, a glass sheet is heated while carried by a glass sheet carrying system such as a roll or a bed having a predetermined curvature in a heating furnace so that the heated glass sheet sags gradually due to its self-weight, finally forming a curved surface having the above curvature. The bent glass sheet is usually quenched in a quenching apparatus located adjacent to the heating furnace. Such a method is excellent because it does not require the step of pressing a glass sheet. In order to reap full advantage of the method, various improvements have been conventionally provided to be put to practical use (Publication of Japanese Examined Patent Application No. 44-14832, Publication of Japanese Examined Patent Application No. 48-5242, and Publication of Japanese Unexamined Patent Application No. 7-237928).

For example, Publication of Japanese Unexamined Patent Application No. 7-237928 discloses a method comprising blowing a gas on one surface of a glass sheet, while the glass sheet is carried out from a heating furnace to a quenching apparatus, to provide a difference in temperature in the temperature range of its softening point or above to intentionally provide a difference in a contraction rate for both surfaces of the glass sheet. This method aims at improving the degree of freedom for forming a glass sheet without limiting the shape of the glass carrying system.

However, the method described in the Publication of Japanese Unexamined Patent Application No. 7-237928 requires further providing a gas blowing system between the heating furnace and the quenching apparatus for a glass sheet. Also, this method requires discharging a gas from the gas blowing system at a pressure basically higher than that of the cooling gas. Therefore, the manufacturing method cannot be conveniently implemented by the conventional apparatus.

SUMMARY OF THE INVENTION

An object of the present invention is, in light of the situation as described above, to provide a method for manufacturing a bent and tempered glass sheet which can conveniently improve the degree of freedom for forming a glass sheet and an apparatus for manufacturing the same.

The method for manufacturing a bent and tempered glass sheet according to the present invention comprises bending a glass sheet utilizing its self weight while heating and passing the glass sheet through a heating furnace, and quenching the glass sheet while carrying the glass sheet with a cooling gas blown onto both surfaces of the glass sheet in a quenching apparatus adjacent to the heating furnace.

In the method, the cooling gas provides the glass sheet with a distribution of a temperature that gives different temperatures between the both surfaces of the glass sheet and/or a distribution of a static pressure which is nonuniform in a part of at least one surface of the glass sheet. The distributions are given to the glass sheet in at least one section in the quenching apparatus.

Such a method can conveniently improve the degree of freedom for forming a glass sheet in a bending and tempering method for forming a glass sheet utilizing its self-weight.

An aspect of the method of the present invention is that the cooling gas begins to blow onto one of the surfaces of the glass sheet before the cooling gas begins to blow onto the other surface. Such a method can provide the distribution of a temperature.

Another aspect of the present invention is that the cooling gas provides the glass sheet with the distribution of a static pressure to modify a shape of the glass sheet from a shape bent by utilizing its self-weight. A specific part of one side of the glass surfaces where a relatively high static pressure is exerted is partly pushed out to the other side of the surfaces where a relatively low static pressure is exerted, while the static pressures on both surfaces of the glass sheet are balanced as a whole.

The idea of the method of the present invention is different from that of the prior art as described above, because a cooling gas for tempering the glass sheet in the quenching apparatus is also used for achieving the object.

An apparatus for manufacturing a bent and tempered glass sheet according to the present invention comprises a heating furnace for heating a glass sheet having a glass sheet carrying outlet; a quenching apparatus having a glass sheet carrying inlet adjacent to the glass sheet carrying outlet of the heating furnace; and a glass sheet carrying system having a curvature in a direction substantially perpendicular to a glass sheet carrying direction for carrying a glass sheet to the quenching apparatus through the heating furnace. The quenching apparatus also has a cooling gas blowing system for discharging a cooling gas into a glass sheet carrying path, and an exhaust path for exhausting the cooling gas.

The quenching apparatus has a cooling gas blowing system for providing a distribution of a temperature which is different between the both surfaces of the glass sheet and/or an exhaust path restriction system for providing a distribution of a static pressure which is nonuniform in a part of at least one surface of the glass sheet. The cooling gas blowing system and/or the exhaust path restriction system are placed in at least one section in the quenching apparatus.

An aspect of the apparatus of the invention is that the cooling gas blowing means has different ends at the most upstream with respect to the transferring the glass sheet on both sides of the carrying path. With such an apparatus, an apparatus for manufacturing a bent and tempered glass sheet that can conveniently improve the degree of freedom for forming basically can be achieved without further providing a new gas blowing system to a conventionally used heating furnace and quenching apparatus. In other words, according to the apparatus, one surface of the glass sheet carried by the carrying means is begun to be cooled before the other surface of the glass sheet is begun to be cooled in the quenching apparatus to provide a temperature distribution as described above.

Another aspect of the invention is that an exhaust path restriction system is placed in at least a part of the exhaust path. With such an apparatus, the nonuniform distribution can be provided to the static pressure applied to the surface of the glass sheet by partially controlling an exhaust of the cooling gas, and therefore the method also can be implemented easily and reliably.

These and other advantages of the present invention will become apparent to those skilled in the art upon reading and understanding the following detailed description with reference to the accompanying figures.

DETAILED DESCRIPTION OF THE PREFERRED EMBODIMENT

In the method for utilizing a distribution of the temperature, it is preferred that the cooling air begins to blow onto one of the surfaces of the glass sheet before the cooling air begins to blow onto the other surface of the glass sheet while the other surface of the glass sheet is supported. Such a supporting can prevent the glass sheet from changing its position greatly.

Also, in the method for manufacturing a bent and tempered glass sheet, it is preferred that the cooling gas blows onto one of the surfaces of the glass sheet to lower a temperature of the surface to the softening point of the glass sheet or lower before the cooling gas blows onto the other surface of the glass sheet. More preferably, the one surface of the glass sheet is cooled to a temperature of a strain point of the glass sheet or lower. Such a significant difference in timing for the start of cooling for the glass sheet can increase the degree of freedom for bending a glass sheet.

In the method of utilizing a distribution of the static pressure, the glass sheet bent along the shape of a glass sheet carrying system in a heating step can be partially or totally modified to a controlled shape in the quenching step. The method is different from the conventional methods in providing a nonuniform distribution to the static pressure of the cooling gas.

In the above method for manufacturing a bent and tempered glass sheet, it is preferred that the distribution of the static pressure is provided by partially controlling an exhaust of the cooling gas. Thus, the degree of freedom for bending a glass sheet can be improved without controlling the supply of the cooling gas that is complicated in terms of equipment.

It is preferred that the exhaust is partially controlled by an exhaust path restriction system provided in an exhaust path for the cooling gas. Thus, the exhaust of the cooling gas can be partially controlled easily and reliably.

Also, in the above method, the distribution of the static pressure may be provided to either one or both of the upper and lower surfaces of the glass sheet. When providing the distribution of the static pressure to both surfaces of the glass sheet, it is preferred that a static pressure having such a distribution that facilitates the deformation of the glass sheet caused by the distribution of the static pressure on one surface of the glass sheet is applied to the other surface of the glass sheet. Thus, the glass sheet is deformed by the cooperative action of the static pressures applied to both surfaces, and therefore the degree of freedom of bending the glass sheet can be improved further.

When providing the distribution of the static pressure to one surface of the glass sheet, it is preferred that a nonuniform distribution is provided only to a static pressure applied to a lower surface of the glass sheet because the space below the glass sheet is usually narrower than the space above the glass sheet due to the effect of the self-weight of the glass sheet, and therefore a static pressure distribution effective for modifying the shape of the glass sheet is easily provided.

Also, in the above method, the section is provided in the vicinity of a glass sheet carrying inlet of the quenching apparatus because the shape of the glass sheet can be modified more easily by providing the distribution of the static pressure in the section where the glass sheet has a relatively high temperature.

Furthermore, in the method, a curvature can be provided to the glass sheet in a glass sheet carrying direction as well. Such a glass sheet can be manufactured by a method in which the distribution of the static pressure is changed while one glass sheet passes through the section. The static pressure distribution can be changed by remote control of the exhaust path restriction system, for example.

The preferred embodiments of the present invention will be described below with reference to the drawings.

First Embodiment

Figure 1:
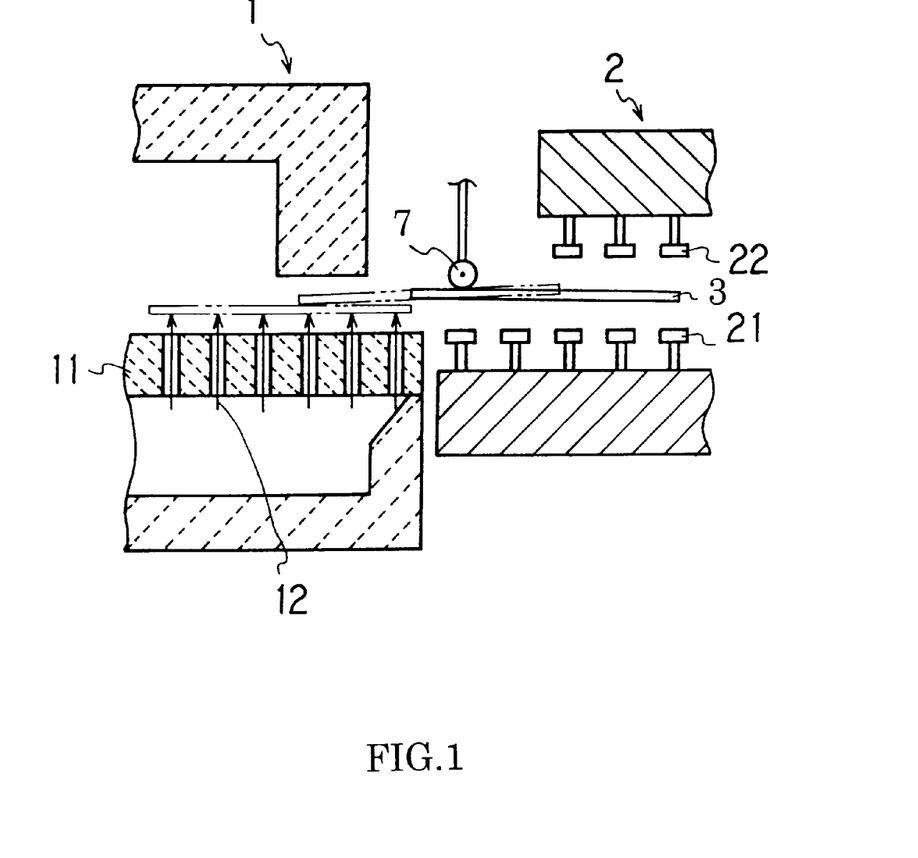
FIG. 1 is a cross-sectional view of an embodiment of the apparatus according to the present invention.

FIG. 1 shows a cross-sectional view of an embodiment of the apparatus for implementing the method for bending and tempering a glass sheet according to the present invention. In a heating furnace 1, an air table 11 is provided for carrying a glass sheet 3. The air table 11 has a number of nozzle holes, and the heated air blown off from these nozzle holes jets on the lower surface of the glass sheet 3, supporting and carrying the glass sheet. This hot air serves to carry the glass sheet 3 while floating it and to soften the glass sheet by heating. In the heating furnace 1, the glass sheet 3 is heated to be deformed along the shape of the surface of the air table due to the self-weight of the glass sheet to have a predetermined curvature.

The air table 11 has a curvature in the direction perpendicular to a glass sheet carrying direction and typically has a convex upward shape. However, the air table 11 may have a convex downward shape, and the shape may be almost flat in order to obtain a flat-like tempered glass. Also, a roll or the like may be substituted for the air table 11 as the glass sheet carrying system.

One feature of this apparatus is that the heating furnace 1 and the quenching apparatus 2 are located adjacent to each other because the apparatus does not require the press dies for putting a softened glass therebetween for forming. The heating furnace 1 and the quenching apparatus 2 are located as closely as possible in view of improving the strength of the glass sheet.

Inside the quenching apparatus 2 located adjacent to the heating furnace 1, a plurality of quench modules 21 and 22 are provided from the upper and lower sides and oriented toward the glass sheet 3 carrying path. The glass sheet is tempered while being carried by cooling gas (typically cooling air) supplied from the quench modules 21 and 22. The shape of the quench modules 21 and 22 need not be limited to the shape as shown in FIG. 1. For example, the modules may have a tube-like shape.

As shown in FIG. 1, in the first embodiment, the quench modules 22 above the glass sheet carrying path are provided at a more downstream position with respect to the glass sheet carrying direction than the quench modules 21 below the glass sheet carrying path. In other words, the most upstream module below the carrying path is positioned further upstream with respect to the carrying direction than the most upstream module above the carrying path.

In order to improve the productivity, usually, a plurality of glass sheets are continuously supplied to the tempering apparatus. The glass sheets each are continuously heated in the heating furnace 1 to be bent, and carried from the heating furnace 1 to the quenching apparatus 2 to be tempered by quenching in the quenching apparatus 2. In order to treat the glass sheets continuously carried, usually, the cooling gas is continuously discharged in the quenching apparatus 2. In the apparatus shown in FIG. 1, the cooling gas from the quench modules 21 and 22 is continuously discharged as well.

Therefore, the glass sheet 3 carried out from the heating furnace 1 is further carried in the quenching apparatus 2, where cooling is first started with respect to only the lower surface of the glass sheet 3 by the cooling gas discharged upward from the quench modules 21. Then cooling is started with respect to the upper surface of the glass sheet 3 by the cooling gas discharged downward from the quench modules 22, so that the upper and lower surfaces of the glass sheet are quenched.

The starting points of the cooling for the upper and lower surfaces of the glass sheet are thus different from each other. Such a timelag makes the coefficients of contraction for the surfaces of the glass sheet different from each other. Therefore, the glass sheet is formed to have a shape somewhat different from that at the time the glass sheet was carried out from the heating furnace, where the glass sheet is bent by conforming to the shape of the air table 11. For example, for forming a glass sheet having a convex upward shape and when the lower surface of the glass sheet was cooled before the upper surface as shown in FIG. 1, the glass sheet is bent less than when it was carried out from the heating furnace. By such a timelag in the start of cooling for the upper and lower surfaces of the glass, the degree of freedom for bending a glass sheet can be increased.

The glass sheet preferably has a temperature around its softening point when it is carried out from the heating furnace. By blowing a cooling gas only on one surface of the glass sheet, the temperature of that surface decreases preceding that of the other surface, so that the temperature of the surface preferably decreases to the softening point of the glass sheet or lower, more preferably to the strain point of the glass sheet or lower, before blowing a cooling gas on the other surface of the glass sheet. Also, the glass sheet more preferably has a temperature between its strain point and its softening point when it is carried out from the heating furnace.

Furthermore, in the apparatus shown in FIG. 1, a ring roller 7 is provided above the glass carrying path. The ring roller 7 serves to prevent the glass sheet being carried from being lifted too high by the cooling gas blown from only the quench modules 21. With the ring roller 7, the glass sheet can be carried stably. The ring roller functions effectively when the quench modules on one side are positioned rearward by a certain distance or longer. This distance depends on the weight of the glass sheet to be carried, the carrying speed, and the like. For a typical automobile side glass, it is preferable to provide the ring roller 7 when the distance for cooling by only the modules on one side is longer than 40 mm.

The ring roller is convenient for supporting the surface of the glass sheet. However, the supporting need not be limited to the ring roller. For example, heated gas such as hot air can be used.

When using a support such as rollers, it is preferable to provide this support in a position opposing the quench module provided on the most upstream side of the glass carrying path because the position is effective for maintaining the attitude of the glass sheet well. However, the number of the supports such as rollers need not be limited to one as shown in FIG. 1. A plurality of the supports may be provided as required.

In order to implement the method of the present invention, in the apparatus shown in FIG. 1, the quenching apparatus above the glass sheet carrying path is positioned rearward on the glass sheet carrying downstream side. Instead of positioning the apparatus rearwardly, a padding may be stuffed into the quench module 22 located within a predetermined distance from the most upstream position to prevent a cooling gas from discharging.

Second Embodiment

Figure 2:
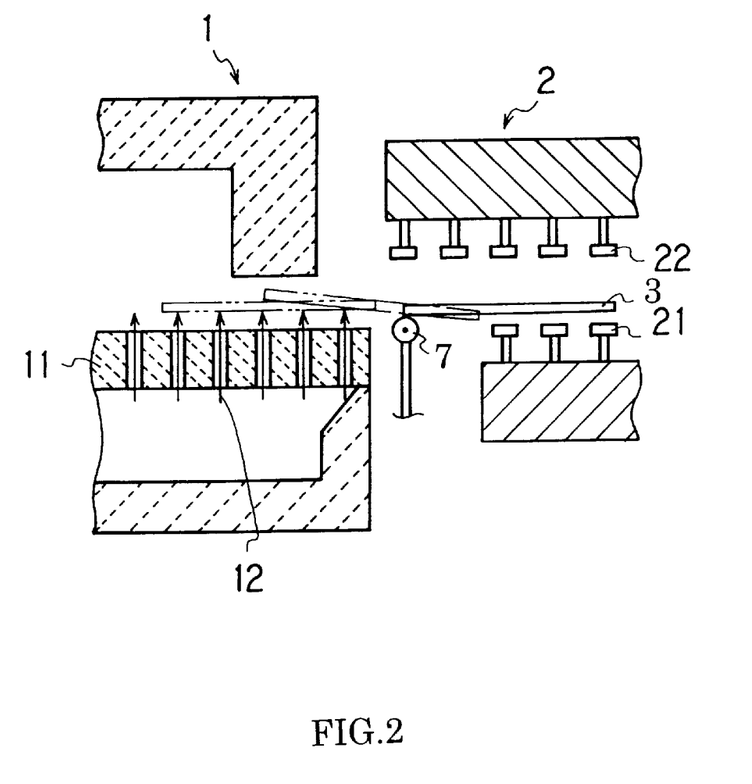
FIG. 2 is a cross-sectional view of another embodiment of the apparatus according to the present invention.

In the apparatus shown in FIG. 2, the quenching apparatus on the lower side of the glass sheet carrying path is positioned rearward on the carrying downstream side, contrary to the apparatus shown in FIG. 1, so that the upper surface of the glass sheet carried out from the heating furnace is cooled before the lower surface is begun to be cooled.

When the upper surface of the glass sheet is cooled earlier than the lower in forming a glass sheet having a convex upward shape, the glass sheet can be further bent than when it was carried out from the heating furnace.

Third Embodiment

Figure 3:
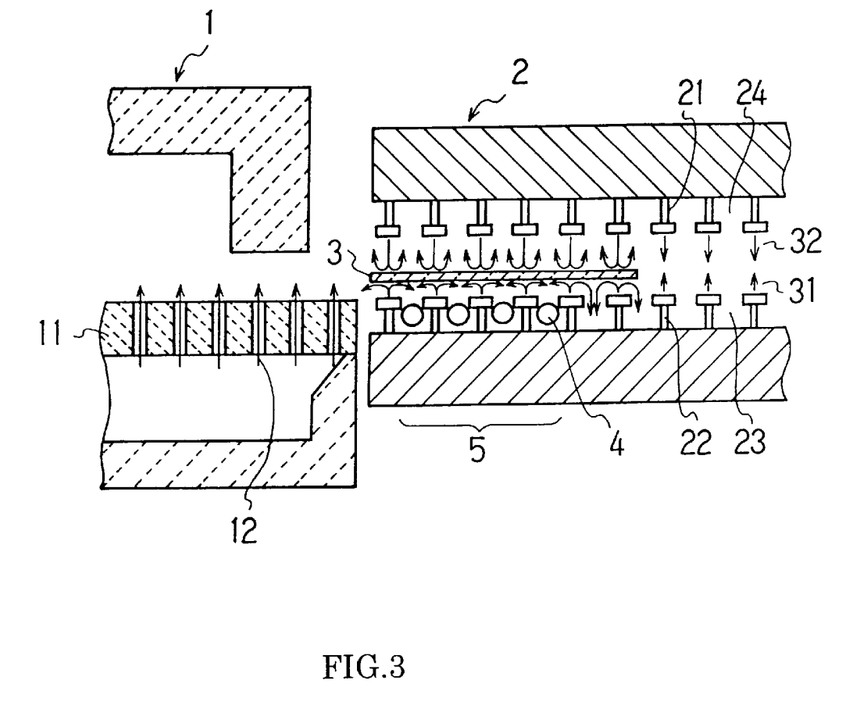
FIG. 3 is a cross-sectional view of an embodiment of the apparatus according to the present invention.

FIG. 3 shows a cross-sectional view of an example of the apparatus of the present invention. In a heating furnace 1, an air table 11 is provided for carrying a glass sheet. The air table 11 has a number of nozzle holes, and the heated air blown off from these nozzle holes jets on the lower surface of a glass sheet, supporting and carrying the glass sheet. The hot air 12 serves to carry the glass sheet while floating it and to soften the glass sheet by heating. The bent glass sheet is heated to a temperature range around its softening point (preferably between its strain point and its softening point) to have a constant curvature along the shape of the surface of the air table due to its self-weight.

The air table 11 typically has a curvature in the direction perpendicular to a glass sheet carrying direction and has a convex upward shape. However, the air table 11 may have a convex downward shape. Also, a roll or the like may be substituted for the air table 11 as the glass sheet carrying system.

Inside a quenching apparatus 2 located on the carrying downstream side adjacent to the heating furnace 1, a plurality of quench modules 21 and 22 are provided from the upper and lower sides toward the glass sheet carrying path. The glass sheet is tempered by quenching while being carried by cooling gas (typically cooling air) 31 and 32 supplied from the quench modules 21 and 22. The shape of the quench modules 21 and 22 need not be limited to the shape as shown in FIG. 3. For example, the modules may have a tube-like shape.

Also, the heating furnace 1 and the quenching apparatus 2 preferably are located as closely as possible in view of improving the strength of the glass sheet.

The cooling gas supplied from the quench modules 21 and 22 is mainly released through cooling gas discharge paths 23 and 24. The cooling gas discharge paths 23 and 24 usually have a capacity sufficient for releasing the cooling gas. In the manufacturing apparatus shown in FIG. 3, exhaust path restriction devices 4 are located in a part of the cooling gas discharge paths, so that, in a section 5 where the restriction devices 4 are located, the discharge of the cooling gas 31 is partially restricted. In the portion where the discharge of the cooling gas 31 is restricted, the static pressure of the gas on the surface of the glass sheet increases.

Figure 4:
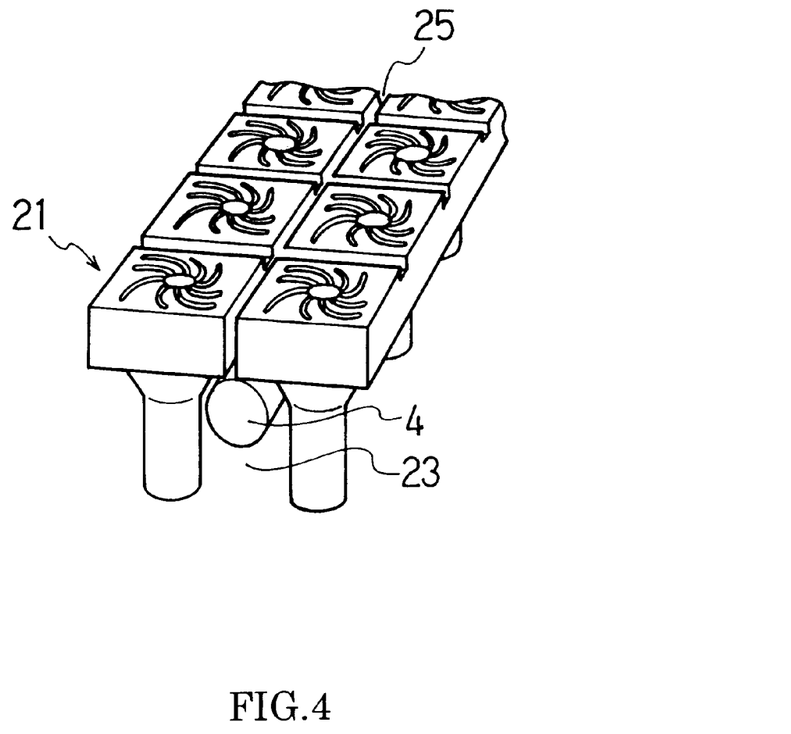
FIG. 4 is a perspective view of an embodiment of the quench module portion used in the apparatus of the present invention.

FIG. 4 shows a perspective view of the quench modules 21, in the section 5 where the exhaust path restriction device 4 is placed. As shown in FIG. 4, a slit-like space extending in the direction of the width of the glass carrying path (a horizontal direction perpendicular to the glass carrying direction) is provided between the quench modules 21 as the exhaust inlet to the cooling gas discharge path 23. The exhaust path restriction device 4 is located below and close to the exhaust inlet 25, restricting the release of the cooling gas 31 discharged from the quench module 21. Also, the restriction device 4 may be provided on a more downstream side of the discharge path 23. However, the restriction device 4 is preferably located near the exhaust inlet 25 to obtain a static pressure distribution that effectively affects the shape of the glass sheet.

Figure 5:
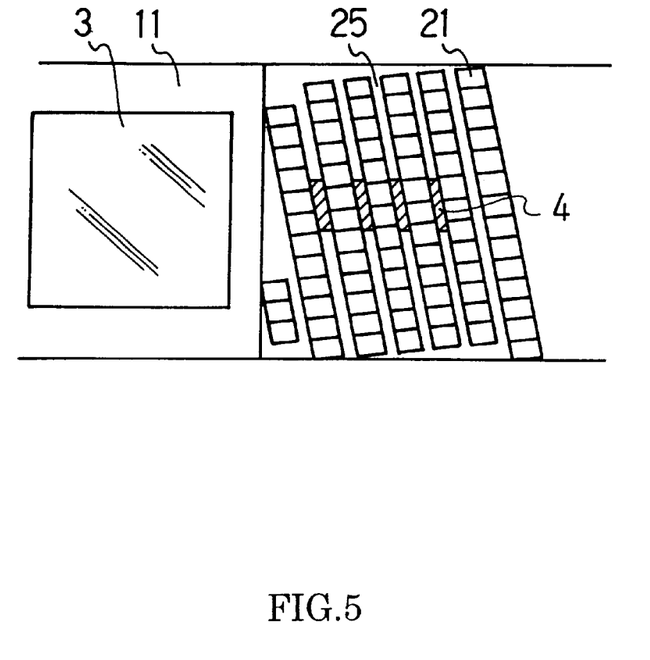
FIG. 5 is a plan view of an embodiment of the air table and the quench module portion used in the apparatus of the present invention.

FIG. 5 shows a plan view of the area around the section 5, where the exhaust path restriction device 4 is placed. In FIG. 5, the glass sheet 3 is moved further upstream than in FIG. 3 for easiness of illustration, which is common to FIG. 6. As shown in FIG. 5, the exhaust path restriction device 4 is placed in a part of the width in the direction of the width of the glass carrying path (the central portion in FIG. 5) rather than all the width, restricting the discharge of the cooling gas in that portion. Therefore, a static pressure having a nonuniform distribution in the direction of the width of the glass carrying path is provided to the lower surface of the glass sheet passing through the section 5 where the restriction device 4 is located.

By thus partially restricting the discharge of the cooling gas in the quenching apparatus, the static pressure having a nonuniform distribution is provided to the surface of the glass sheet, and the shape of the glass sheet can be modified by this static pressure. In other words, according to the location of the restriction device 4 shown in FIG. 5, the static pressure on the lower surface of the glass sheet is higher in the central portion of the carrying path, so that this portion of the glass sheet is raised upward. Therefore, a glass sheet bent to have a convex upward shape can be controlled so that the curvature of its central portion is lowered.

Figure 6:
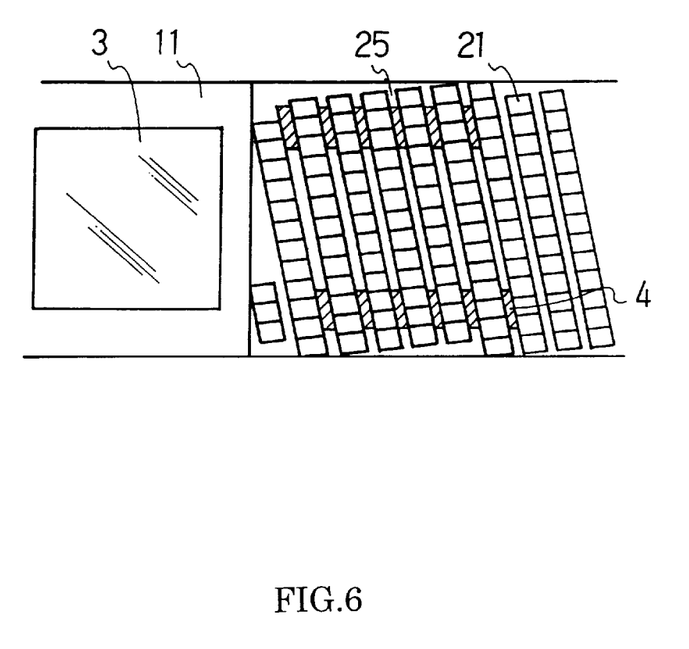
FIG. 6 is a plan view of another embodiment of the air table and the quench module portion.

The location of the exhaust path restriction device 4 need not be limited to the location shown in FIG. 5. For example, the restriction device 4 may be placed near the edge portions of the glass sheet to be carried as shown in FIG. 6. In this case, the static pressure on the lower surface of the edge portions of the glass sheet is higher, and therefore the glass sheet bent to have a convex upward shape is deformed so that the curvature of the edge portions is raised.

The material and the shape of the exhaust path restriction device 4 need not be limited to a specific material and shape as long as the restriction device functions as the exhaust obstacle in the cooling gas discharge paths 23 and 24. Any suitable material such as metal materials, resin materials, or inorganic materials can be used.

Also, the shape of the restriction device need not be limited to the shape having a circular cross-section as shown in FIGS. 1 and 2, and the shape need not be limited to a rod shape. Any shape such as sheet-like shape, lump-like shape, or pipe-like shape can be used.

Also, the restriction device 4 may be located over the entire length of the carrying path of the quenching apparatus 2, or the restriction device may be located in at least one of the sections provided by dividing the carrying path in the direction of its length. However, it is preferred that the restriction device 4 is at least placed near the glass sheet carrying inlet of the quenching apparatus 2 as shown in FIG. 5 as described above.

Figure 7:
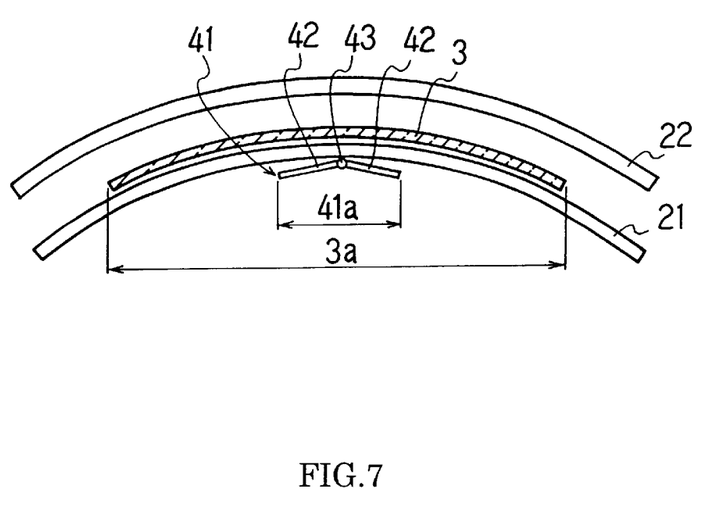
FIG. 7 is a cross-sectional view of an embodiment of the glass carrying path portion in the quenching apparatus used in the manufacturing apparatus of the present invention.

Next, a specific example of the exhaust path restriction device 4 will be described. FIG. 7 shows a cross-sectional view of the glass carrying path and its vicinity in the quenching apparatus seen from the glass carrying upstream side toward the downstream side, in which an exhaust valve 41, an example of the exhaust path restriction device 4, is placed in the central portion of the glass carrying path. The valve 41 has a structure in which two rods 42 are connected via a shaft portion 43. The rods 42 extending like a wing on both sides of the shaft portion 43 can be rotated around the shaft portion 43 by remote operation so that the restriction of the exhaust path 23 is controlled by the rotation of the rods 42.

By locating the shaft portion 43 in the position being substantially in contact with the lower portion of the quench module 21 as shown in FIG. 7, the exhaust valve 41 can function so that the restriction of the exhaust path caused by the rotation of the rods 42 is at the maximum near the shaft portion 43 and is gradually released as being away from the shaft portion 43. Therefore, by locating the shaft portion 43 in the central portion of the carrying path, the restriction is gradually released as approaching the edge portions of the carrying path. Such an exhaust valve 41 is excellent because it can provide a smooth static pressure distribution to the glass sheet. Also, if the static pressure distribution is changed by adjusting the angle of the rods 42 by remote control while one glass sheet passes, the curvatures in the front end portion and the back end portion of the glass sheet in its carrying direction can be changed, and furthermore, the curvature can be provided in the carrying direction.

The shape of the exhaust valve 41 need not be limited to the shape shown in FIG. 7. For example, the rods 42 may be extended over the entire width in the direction of the width of the carrying path, being curved along the quench module 21, or they may be further extended. Also, other shapes such as sheet, rather than the rods 42, may be used.

Thus, an exhaust path restriction device 4 preferably comprises an arm member and a shaft member connected to one end of the arm member.

The exhaust path also can be restricted by providing a padding member for inhibiting the outflow of the cooling gas in part of the exhaust path inlet 25. In other words, by providing the padding member in part of the exhaust inlet in the direction of the width of the carrying path, a nonuniform static pressure distribution can be provided to the glass sheet in a manner similar to that of the above exhaust valve 41. This method is convenient and preferred especially when the restriction of the exhaust path need not be changed. In this case, rubber tubes, roll-like glass fabrics, or the like can be preferably used for the padding member.

Forth Embodiment

Next, an embodiment in which static pressure distributions are provided to both surfaces of a glass sheet will be described.

Figure 8:
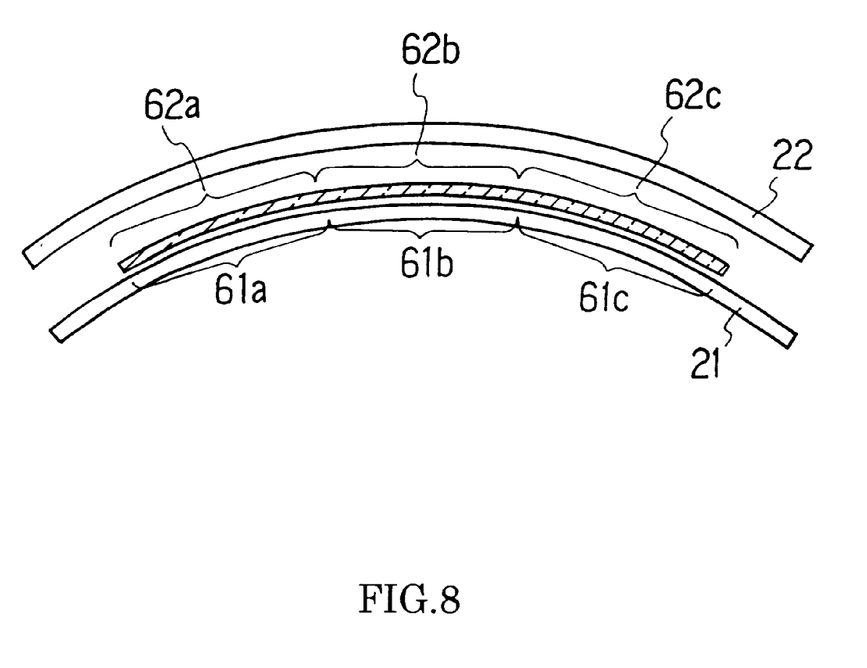
FIG. 8 is a cross-sectional view of an embodiment of the glass carrying path portion in the quenching apparatus with division of the carrying path.

FIG. 8 shows a cross-sectional view of the glass carrying path and its vicinity in the quenching apparatus seen from the glass carrying upstream side toward the downstream side, similar to that of FIG. 7. The carrying path is divided into three regions in the direction of its width (left portions 61a and 62a, central portions 61b and 62b, and right portions 61c and 62c). The static pressures can be controlled individually in each region or in each surface of the glass sheet by exhaust path restriction devices as described above.

When providing distributions to the static pressures on both surfaces of the glass sheet, it is preferred that the static pressure distributions on both surfaces are controlled so that the deformation of a glass sheet by one distribution can be encouraged by the other distribution. More specifically, when further bending the glass sheet that is formed to have a convex upward shape, the static pressures on the portions corresponding to the lower surface of the glass central portion 61b and the upper surfaces of the glass end portions 62a and 62c are set higher so that the actions on the static pressure distributions of the upper and lower surfaces can provide a desired shape effectively. On the other hand, when reducing the curvature of a glass sheet that is formed to have a convex upward shape, to bend it less, the static pressures on the portions corresponding to the upper surface of the central portion 62b and the lower surfaces of the glass end portions 61a and 61c should be set higher.

The method for providing distributions to the static pressures on both surfaces of the glass sheet provides a higher degree of freedom for formation than the method for providing a static pressure only to one surface of the glass sheet. Also, this method provides excellent stability in carrying a glass sheet when greatly modifying the shape of the glass sheet.

In the embodiments of the present invention as described above, attention should be given to the fact that the quenching of the glass sheet is reduced by a partial rise in static pressure. Therefore, the static pressure is preferably controlled to satisfy the thermal conductivity for the required quenching determined by the thickness of the glass sheet, a predetermined strength, and the like.

EXAMPLE

Next, specific examples in which the shape of a bent and tempered glass sheet is modified by the method of utilizing a static pressure distribution will be described.

Example 1

Figure 12:
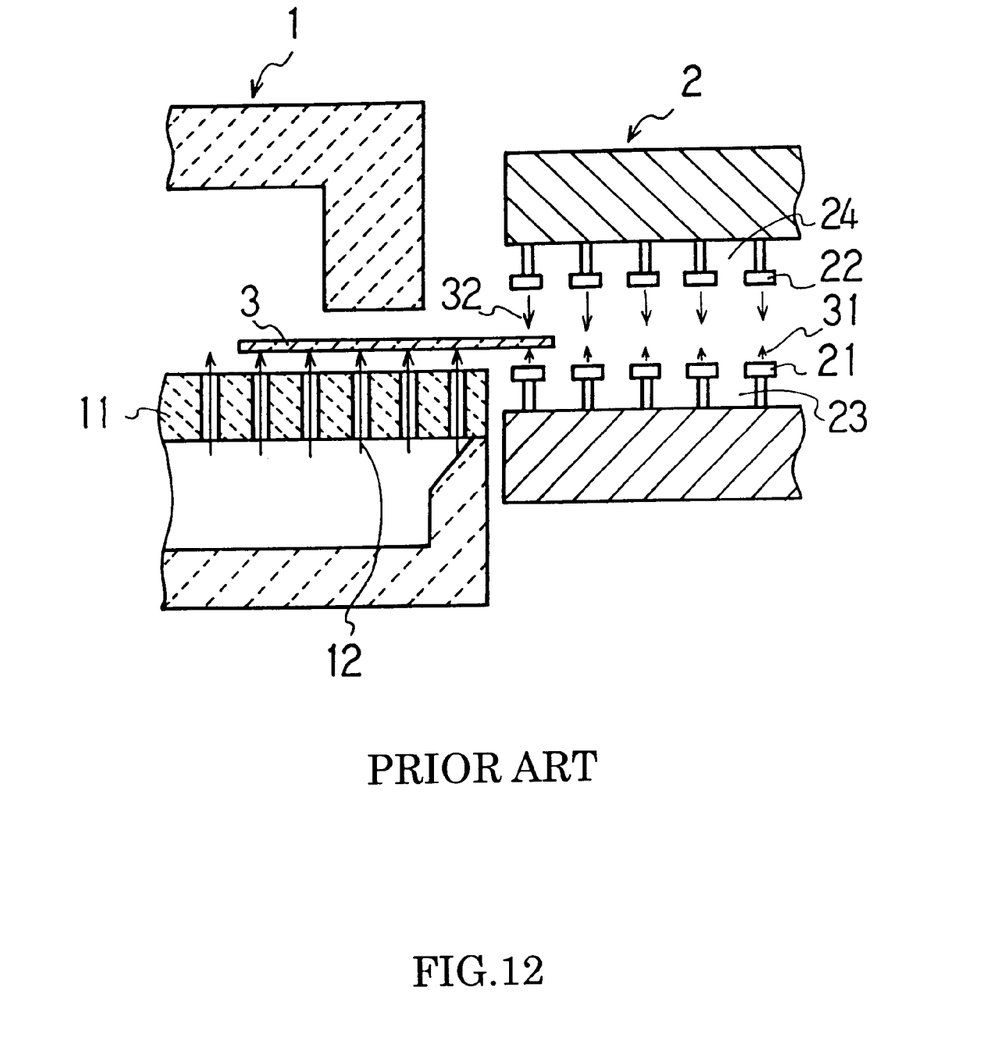
FIG. 12 is a cross-sectional view of a conventionally used bending and tempering apparatus.

A green glass sheet having a thickness of 3.1 mm and a rectangular shape of 500 mm by 600 mm was supplied to an apparatus for bending and tempering a glass sheet conventionally used as shown in FIG. 12 so that the short side having a length of 500 mm was in the direction of the width of the glass carrying path. As a result, a bent and tempered glass sheet of a convex upward shape having a uniform curvature of 1300 mm was obtained. This curvature was equal to that provided to the air table near the glass carrying outlet of the heating furnace and to the glass carrying path in the quenching apparatus.

Next, exhaust valves 41 were provided in the lower center of the carrying path in the quenching apparatus in a manner similar to that shown in FIG. 7 to partially modify the curvature of the glass sheet. The length of the exhaust valve 41 in the direction of the width of the carrying path (41a in FIG. 7) was 100 mm, corresponding to 20% of the width of the glass sheet (3a in FIG. 7). Rods 42 were positioned so that the restriction of the exhaust was reduced as approaching the end portions from the central portion. The exhaust valves were placed in the exhaust inlets of the quenching apparatus, in the first to the fourth rows on the most upstream for carrying the glass sheet, in a manner similar to that shown in FIG. 5.

Figure 10:
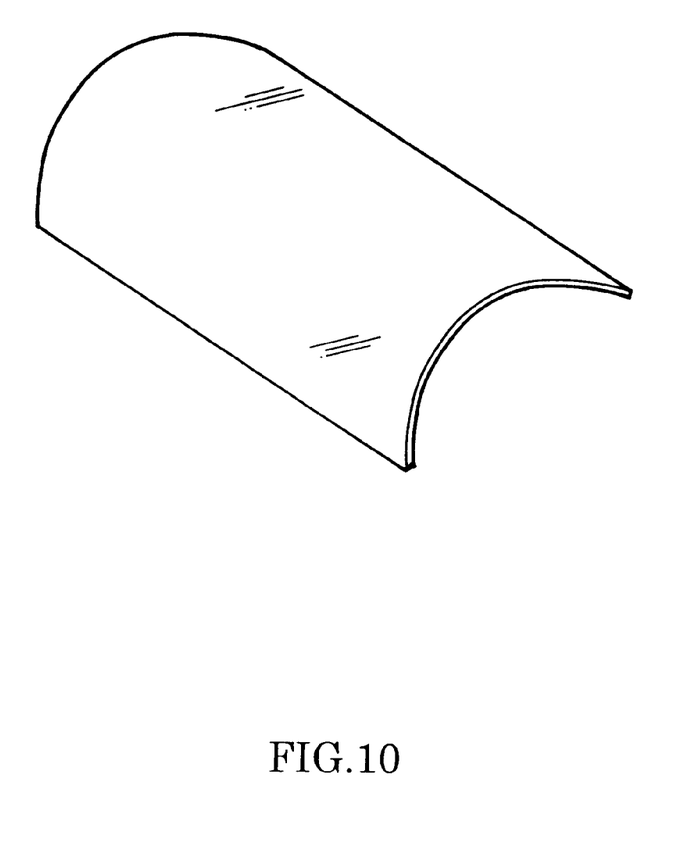
FIG. 10 is a perspective view of a bent and tempered glass sheet manufactured according to Example 1.

The same glass sheet as the above was thus supplied to the apparatus. As a result, a bent and tempered glass sheet whose edge portions have a curvature of 1300 mm and whose central portion has a curvature of 1100 mm was obtained. The curvature of the obtained glass was smoothly changed as a whole rather than being changed only in the portion, as shown in FIG. 10.

Example 2

Figure 9:
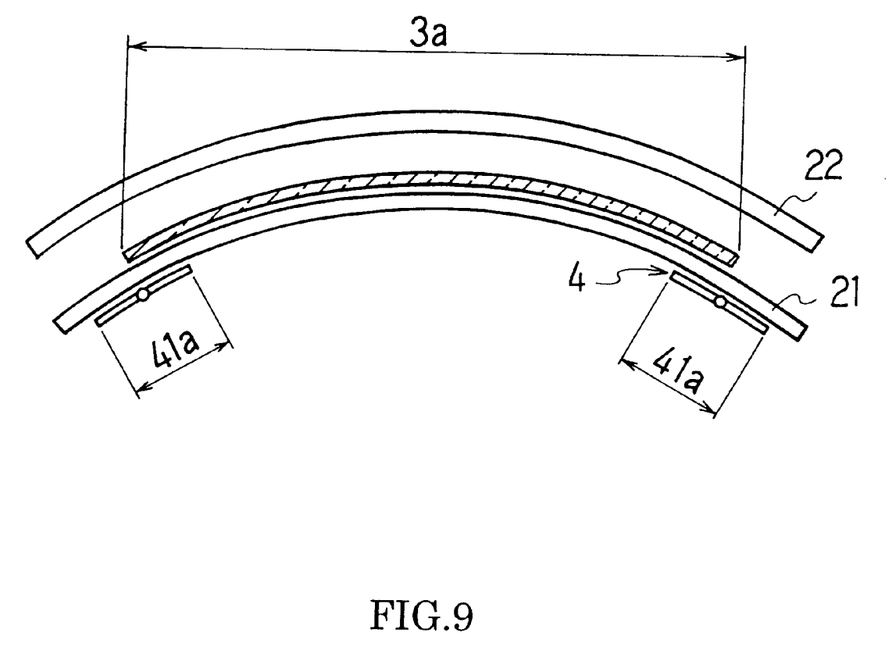
FIG. 9 is a cross-sectional view of another embodiment of the glass carrying path portion in the quenching apparatus.
Figure 11:
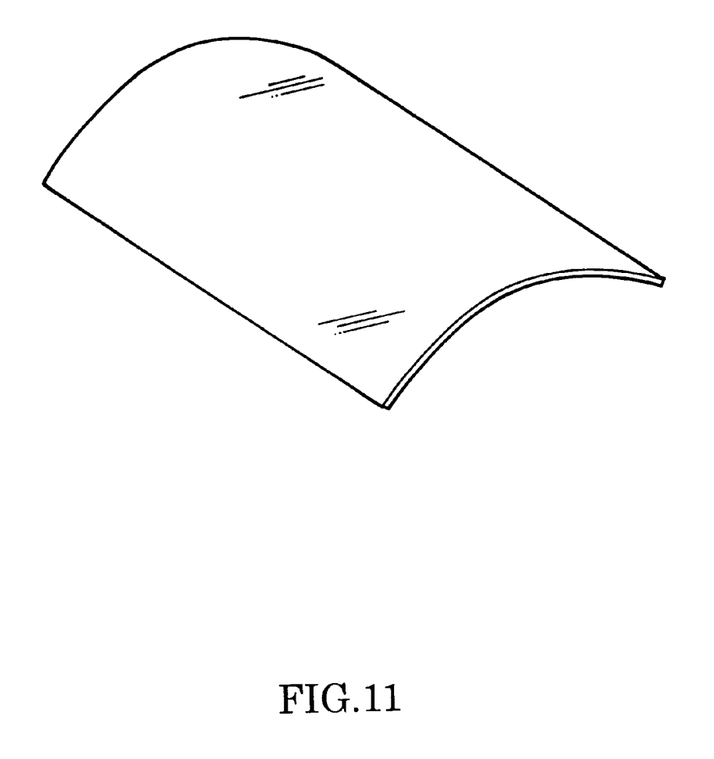
FIG. 11 is a perspective view of a bent and tempered glass sheet manufactured according to Example 2.

As shown in FIG. 9, exhaust valves 41 were placed at the edge portions of the lower portion of the carrying path so that approximately half the length of the exhaust valve (about 50 mm) overlapped the region for passage of a glass sheet 3. Also, the exhaust valves 41 were provided in the exhaust inlets of the quenching apparatus, in the first to the sixth rows on the most upstream position for carrying the glass sheet, in a manner similar to that shown in FIG. 6. A glass sheet was supplied to the apparatus in a manner similar to that of Example 1, except for the above manner. As a result, a bent and tempered glass sheet whose edge portions have a curvature of 1500 mm and whose central portion has a curvature of 1300 mm was obtained. The curvature of this glass sheet was smoothly changed as shown in FIG. 11.

Example 3

Exhaust valves 41 were located in a similar manner to that of Example 1, and the restriction of the exhaust valve 41 was changed by remote operation while one glass sheet passed. As a result, a two-dimensionally bent glass sheet, whose central portion has a lower curvature where the exhaust path was restricted and that has a substantially uniform curvature where the exhaust path was open, was obtained.

The invention may be embodied in other forms without departing from the spirit or essential characteristics thereof. The embodiments disclosed in this application are to be considered in all respects as illustrative and not restrictive, the scope of the invention is indicated by the appended claims rather than by the foregoing description, and all changes which come within the meaning and range of equivalency of the claims are intended to be embraced therein.

What is claimed is:

1. A method for manufacturing a bent and tempered glass sheet, comprising:

bending a glass sheet having a first surface and a second surface utilizing weight of the glass sheet while heating and passing the glass sheet through a heating furnace; and quenching the glass sheet while carrying the glass sheet by blowing a cooling gas onto the first and second surfaces of the glass sheet in a quenching apparatus adjacent to the heating furnace; wherein the cooling gas begins to be blown onto the first surface before the cooling gas begins to be blown onto the second surface in the quenching apparatus, and the cooling gas is blown onto the first surface so as to lower a temperature of the first surface of the glass sheet to a softening point of the glass sheet or less before the cooling gas begins to be blown onto the second surface.

2. A method for manufacturing a bent and tempered glass sheet, comprising:

bending a glass sheet having a first surface and a second surface utilizing weight of the glass sheet while heating and passing the glass sheet through a heating furnace; and quenching the glass sheet while carrying the glass sheet by blowing a cooling gas onto the first and second surfaces of the glass sheet in a quenching apparatus adjacent to the heating furnace; wherein the cooling gas provides the glass sheet with a non-uniform distribution of a static pressure in at least one surface of the first and second surfaces in at least one section in the quenching apparatus so that a shape of the glass sheet is modified from a shape bent by utilizing weight of the glass sheet.

3. A method according to claim 2, wherein the distribution of the static pressure is provided by partially controlling exhausting of the cooling gas.

4. A method according to claim 3, wherein the exhausting of the cooling gas is partially controlled by an exhaust path restriction provided in an exhaust path for the cooling gas.

5. A method according to claim 2, wherein a static pressure having such a distribution that facilitates the deformation of the glass sheet caused by the distribution of the static pressure on the first surface of the glass sheet is applied to the second surface of the glass sheet.

6. A method according to claim 2, wherein the distribution of the static pressure is provided only for a static pressure applied to a lower surface of the glass sheet.

7. A method according to claim 2, wherein the section is provided in the vicinity of a glass sheet carrying inlet of the quenching apparatus.

8. A method according to claim 2, wherein the distribution of the static pressure is changed while one glass sheet is passing through the section.

9. An apparatus for manufacturing a bent and tempered glass sheet comprising:

a heating furnace for heating a glass sheet comprising a glass sheet carrying outlet;

a quenching apparatus comprising a glass sheet carrying inlet adjacent to the glass sheet carrying outlet of the heating furnace, a cooling gas blowing system located on upper and lower sides of a glass sheet carrying path for discharging a cooling gas into the glass sheet carrying path, and an exhaust path for exhausting the cooling gas; and a glass sheet carrying system having a curvature in a direction substantially perpendicular to a glass sheet carrying direction for carrying a glass sheet to the quenching apparatus through the heating furnace;

wherein the quenching apparatus provides an exhausting path restriction for providing a distribution of a static pressure in at least one section in the quenching apparatus.

10. An apparatus according to claim 9, wherein the exhaust path restriction has a shaft member and an arm member having one end connected to the shaft member.

* * * * *